United States Patent
Rechkemmer et al.

(10) Patent No.: US 11,685,284 B2
(45) Date of Patent: Jun. 27, 2023

(54) OPTIMIZATION SYSTEM AND AN OPTIMIZATION METHOD

(71) Applicant: Robert Bosch GmbH, Stuttgart (DE)

(72) Inventors: Sabrina Kathrin Rechkemmer, Shanghai (CN); Xiaoyun Zang, Shanghai (CN); Oliver T. H. Sawodny, Shanghai (CN); Alexander Boronka, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 17/044,208

(22) PCT Filed: Apr. 13, 2018

(86) PCT No.: PCT/CN2018/082965
§ 371 (c)(1),
(2) Date: Sep. 30, 2020

(87) PCT Pub. No.: WO2019/196094
PCT Pub. Date: Oct. 17, 2019

(65) Prior Publication Data
US 2021/0094435 A1    Apr. 1, 2021

(51) Int. Cl.
*B60L 53/66* (2019.01)
*B60L 53/64* (2019.01)
*H02J 7/00* (2006.01)

(52) U.S. Cl.
CPC .......... *B60L 53/66* (2019.02); *B60L 53/64* (2019.02); *B60L 53/665* (2019.02); *H02J 7/005* (2020.01);
(Continued)

(58) Field of Classification Search
CPC ....... H60L 53/64; H60L 53/66; H60L 53/665; H02J 7/00; H02J 7/005; H02J 7/0034;
(Continued)

(56) References Cited

U.S. PATENT DOCUMENTS

| | | | |
|---|---|---|---|
| 9,664,745 B1 * | 5/2017 | Fearn | B60L 53/65 |
| 2010/0179704 A1 * | 7/2010 | Ozog | G06Q 10/06315 |
| | | | 703/2 |

(Continued)

FOREIGN PATENT DOCUMENTS

| | | |
|---|---|---|
| CN | 106004477 A | 10/2016 |
| CN | 106503450 A | 3/2017 |

(Continued)

OTHER PUBLICATIONS

International Search Report corresponding to PCT Application No. PCT/CN2018/082965, dated Jan. 18, 2019 (English language document) (3 pages).

*Primary Examiner* — Robert Grant
(74) *Attorney, Agent, or Firm* — Magnot, Moore & Beck LLP (57) ABSTRACT

An optimization system includes a processor configured to receive one or more criteria for optimizing use of a power storage device in an application device, to receive data comprising at least one of user input(s), data from a cloud, and data regarding the application device, and to determine a charging/discharging profile for charging or discharging the power storage device from the received data based on the one or more criteria. The optimization system further includes an output configured to output the charging/discharging profile. The processor is configured to receive user feedback regarding the charging/discharging profile, machine learning data, big data, and/or a change regarding the optimization system and/or the application device, and to update the charging/discharging profile based on the received at least one of the user feedback regarding the charging/discharging profile, machine learning data, big data and the change regarding the optimization system and/or the application device.

20 Claims, 6 Drawing Sheets (52) U.S. Cl.
CPC ......... *H02J 7/0048* (2020.01); *B60L 2250/18* (2013.01); *B60L 2250/20* (2013.01); *H02J 7/00034* (2020.01); *H02J 2310/48* (2020.01)

(58) Field of Classification Search
CPC . H02J 7/0048; H02J 2310/48; B60L 2250/20; B60L 2250/18
USPC ........................................................ 320/109
See application file for complete search history.

(56) References Cited

U.S. PATENT DOCUMENTS

| | | | |
|---|---|---|---|
| 2011/0012563 A1* | 1/2011 | Paryani | H01M 10/0525 320/162 |
| 2011/0156641 A1 | 6/2011 | Kishiyama et al. | |
| 2011/0231028 A1* | 9/2011 | Ozog | H02J 3/008 700/291 |
| 2012/0130556 A1* | 5/2012 | Marhoefer | G06Q 10/04 700/291 |
| 2013/0346762 A1* | 12/2013 | Hodges | G06F 1/3234 713/300 |
| 2016/0006272 A1 | 1/2016 | Greening | |
| 2017/0259683 A1* | 9/2017 | Shimizu | B60L 53/64 |

FOREIGN PATENT DOCUMENTS

| | | |
|---|---|---|
| JP | 2011-138767 A | 7/2011 |
| JP | 2014-11951 A | 1/2014 |
| JP | 2016-537877 A | 12/2016 |
| WO | 2013/051151 A1 | 4/2013 |

\* cited by examiner

OPTIMIZATION SYSTEM AND AN OPTIMIZATION METHOD

This application is a 35 U.S.C. § 371 National Stage Application of PCT/CN2018/082965, filed on Apr. 13, 2018, the disclosure of which is incorporated herein by reference in its entirety.

FIELD OF THE INVENTION

The invention generally relates to charging/discharging a power storage device, and especially relates to an optimization system and method for the use of the power storage device.

BACKGROUND OF THE INVENTION

A power storage device like battery remains a critical part in application devices comprising electric vehicles. As the battery has limited power stored therein and cannot be refueled quickly, and the lifetime of the battery may be relatively low in the electric vehicles despite its longer nominal lifetime, generally, the battery has to be replaced after 1 or 2 years e.g. in an electric scooter, a user may still have low acceptance to the electric vehicles.

There are some optimization schemes for charging/discharging a battery. In one example, an optimization system receives only limited user inputs and optimizes the charging of the battery based on a particular charging optimization criterion such as battery lifetime prolongation, or to meet the user's requirements without focusing on the optimizing criterions such as battery lifetime prolongation. In another example, battery and power supply information along with user input are processed to calculate an optimal charging/discharging cycle. In particular, a charging/discharging cycle for charging/discharging the battery may be determined based on the user's input indicating the user's preference; the preference includes the desire to extend the battery lifetime or to reduce the cost of operating of the battery.

SUMMARY OF THE INVENTION

It would be desirable to provide an improved optimization system and method which may dynamically adjust a charging/discharging profile for optimizing the use of a power storage device e.g. a battery in electric vehicles.

In one embodiment, an optimization system is provided. The optimization system comprises a processor configured to receive one or more criteria for optimizing use of a power storage device in an application device, receive data comprising at least one of user input(s), data from a cloud, and data regarding the application device, and determine a charging/discharging profile for charging or discharging the power storage device from the received data based on the received one or more criteria; and an output for outputting the charging/discharging profile; wherein the processor is further configured to receive at least one of the user feedback regarding the charging/discharging profile, machine learning data, big data, and a change regarding the optimization system and/or the application device, and update the charging/discharging profile based on the received at least one of the user feedback regarding the charging/discharging profile, machine learning data, big data, and the change regarding the optimization system and/or the application device.

In another embodiment, an optimization method is provided, the method comprising receiving one or more criteria for optimizing use of a power storage device in an application device; receiving data comprising at least one of user input(s), data from a cloud, and data regarding the application device; determining a charging/discharging profile for charging or discharging the power storage device from the received data based on the received one or more optimizing criteria; receiving at least one of the user feedback regarding the charging/discharging profile, machine learning data, big data, and a change regarding the optimization system and/or the application device; and updating the charging/discharging profile based on the received at least one of the user feedback regarding the charging/discharging profile, machine learning data, big data, and a change regarding the optimization system and/or the application device.

In a still embodiment, a computer storage medium comprising instructions for, when executed by one or more processors, performing the steps of the optimization method.

One advantage is that the charging/discharging profile for optimizing the use of the power storage device may be dynamically updated.

Another advantage is that multiple criteria for optimizing the use of the power storage device may be considered simultaneously.

Still another advantage is that more information including information regarding parts of the application device other than the power storage device, are taken into account during the optimization.

Various aspects and features of the disclosure are described in further detail below. And other objects and advantages of the present invention will become more apparent and will be easily understood with reference to the description made in combination with the accompanying drawings.

DESCRIPTION OF THE DRAWINGS

The present invention will be described and explained hereinafter in more detail in combination with embodiments and with reference to the drawings, wherein.

The same reference signs in the figures indicate similar or corresponding feature and/or functionality.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Figure 1:
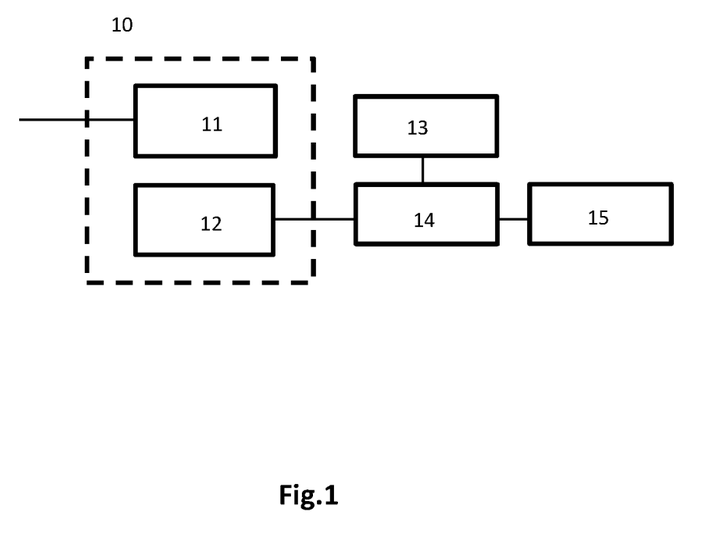
FIG. 1 is a schematic block diagram of an optimization system 10 according to one embodiment of the present invention.

FIG. 1 shows an optimization system 10 according to one embodiment of the present invention. The optimization system 10 may be used to optimize the use of a power storage device 15 like a battery, including charging the power storage device 15 from a power supply 13 by a charging device 14 and or discharging the power storage device 15. The charging device 14 may generate charging currents for charging the power storage device 15. The power storage device 15 is in an application device and used for providing electric power to the application device. The application device may comprise electric vehicles and any application where a power storage that can be charged or discharged is used. The electric vehicles are including but not limited to electric cars, electric two-wheelers, and scooters. The embodiments will be explained with reference to electric vehicles hereinafter, but it does not mean that they cannot be used to other application devices for achieving a similar effect.

The optimization system 10 comprises a processor 11 and an output 12. The processor 11 receives data to be used for optimizing the charging/discharging of the power storage device in electric vehicles. The data comprise at least one of user input(s), data from a cloud and data regarding the electric vehicles, and optionally in case of the charging profile is determined, the data regarding the power supply 13 and/or data regarding the charging device 14. The data regarding the electric vehicles include not only the information regarding the power storage device in the electrical vehicles but also the parameters of other parts of the electric vehicles, e.g., powertrain parts of the electrical vehicles. In this way, more information may be taken into account during the optimization. The received data may be real time data or historical data stored in a memory. The historical data may be existing optimization schemes or heuristic data. The data received to the optimization system may be described later in detail.

The processor 11 also receives one or more criteria for optimizing the use of the power storage device 15 of the electric vehicle. The criteria may be predetermined. Or in one example, the criteria may be input from a user, e.g., a driver, or determined from the received data, such as previous charging/discharging behaviors of a driver. The optimizing criteria may comprise battery lifetime prolongation, range extension, performance, electricity cost, efficiency and/or charging time and so on. In one embodiment, a table of selectable optimizing criteria may be displayed to a driver and then the driver may select one of the optimizing criteria in the table according to which the charge or discharge of the power storage device is optimized. Due to that some of those criteria may depend on each other, for example, range extension also depends on the state of charge of the battery which in turn influences the lifetime, the driver may also select a plurality of optimizing criteria to be considered in combination.

The processor 11 determines a charging/discharging profile for charging/discharging the power storage device 15 from the received data based on the received one or more criteria. The charging profile may be used to generate charging currents for the power storage device. The discharging profile may be represented as e.g. a driving profile showing to the driver to prompt the driving of the driver according to the driving profile. The examples of the charging profile and the discharging profile may be shown and explained with reference to FIGS. 4A, 4B and 6 below. The charging/discharging profile may include various information for charging/discharging the power storage device, including but not limited to the information regarding when the charging/discharging starts and/or ends, values of the charging/discharging currents, a charge/discharge state, a charge/discharge voltage and driving velocities for optimizing the discharge of the power storage device and so on. In the case of multiple optimizing criteria, the processor 11 receives the plurality of optimizing criteria and a weighting factor for each criterion of the plurality of optimizing criteria, determines one or more optimizing parameters for each criterion of the plurality of criteria based on the received data, and determine the charging/discharging profile based on the one or more optimizing parameters and weighting factors. The optimizing parameters may include any information regarding the charging/discharging profile, e.g., charge/discharge currents, a charge/discharge state or a charge/discharge voltage. The weighting factors may be received from a user input or a cloud, or even stored in the optimization system in advance.

In one example, the battery lifetime and efficiency of an inverter/motor are selected as the criteria to be considered in combination. The most efficient input voltage of the inverter/motor may be not the same as an optimal charging voltage for battery lifetime. For example, the optimal charging maximum voltage for battery lifetime might be 55V, but the inverter works most efficiently at 58V. In this case, both the charging maximum voltage optimal for the battery lifetime and the input voltage optimal for efficiency of the inverter/motor are determined in the processor 11, e.g., both of them may form a pareto front. If the weighting factor for the battery lifetime is 20 percent while the weighting factor for efficiency is 80 percent, then the optimal voltage may be 57.4V.

In an embodiment, different from setting the weighting factors, the processor 11 may also select one of the charging optimizing parameters depending on the user's preference/priority and/or default choice.

In one embodiment, the processor 11 determines an expected route and/or power consumption for the electric vehicle according to driving behaviors and/or charging behaviors of the driver or a similar driver, or for similar vehicles, and determines the charging/discharging profile for charging or discharging the power storage device based on the expected route and/or power consumption for the electric vehicle. The output 12 may be coupled to the processor 11 to output the determined charging/discharging profile. The output signal may be lights, various displays, acoustic signal or haptic signals. The output 12 may be a display, a light, a tablet, a touchscreen or an acoustic generator. In one embodiment, the determined charging profile may be directly delivered to a charging device via the output 12 to generate charging currents for the power storage device. In another embodiment, the determined charging profile may be output to a user. The determined discharging profile may be output to the user like the driver to prompt his driving according to the discharging profile or output to the electric vehicle to set limits for one or more parameters of the electric vehicle. The parameters comprise a driving speed and/or acceleration of the vehicle. If a current driving speed and/or acceleration exceed the limits, an alarm may be sent to the driver.

The user may review the charging/discharging profile and request to update the charging/discharging profile by inputting feedback information. In this case, the optimization system shall include an input to be used by the user to input his feedback. The feedback may be provided as acoustic and/or haptic feedback or input data by the user. The feedback may be provided to the optimization system 10 via a user input, which is optionally included in the optimization system 10. The user input may be any kind of input devices that may input information by the user, such as a keyboard, a mouse, a touchscreen and so on. The user may input the information via buttons, e.g., switching between settings and turning on/off a certain function, via sliders, e.g., inputting depart time or desired charge state of charge, or via gesture and speech recognition.

When receiving the user's feedback, the processor 11 may update the charging/discharging profile based on the user's feedback. For example, a driver was used to drive the vehicle at 7 AM, therefore, the charging profile determined according to previous driving behavior of the driver shows that the charge of the power storage device will end at 6:45 (15 minutes are kept as a margin to avoid that the driver may use the vehicle early before 7 AM) so as to ensure the use of the vehicle by the driver at 7 AM, however, the driver changes his schedule tomorrow and will drive the vehicle at 6:30 AM, when the determined charging profile is displayed to the driver, the driver may give feedback to indicate that he wishes to drive the vehicle at 6:30 AM tomorrow, then the processor 11 may update the charging profile according to the feedback from the driver indicative of the changed schedule. According to the updated charging profile, the charge may end at e.g. 6:15 AM. The user may directly change the determined charging profile via the feedback also.

Although it is described above that the processor 11 updates the charging/discharging profile according to only the user's feedback, during the update, the received data may be used again by the processor to update the charging/discharging profile according to the user's feedback.

Except updating the charging/discharging profile responsive to the user's feedback, the processor 11 may also update the charging/discharging profile responsive to machine learning data, big data, or a change regarding any of the optimization system and/or the electric vehicle including the power storage device 15. More particularly, the charging profile may also be updated responsive to a change of the charging device 14 and/or the power supply 13. The change includes any recorded or derived data and setting change as well as software updates. For example, the determined charging/discharging profile may be compared to the machine learning data and/or big data from a cloud to see if the determined charging/discharging profile may e.g., conform to driving behaviors of the driver, and if not, the charging/discharging profile may be updated. The machine learning data and the big data may be derived from data of a similar driver (e.g., drivers having similar charging/driving behaviors), and/or of a similar vehicle. Or, if the inputs from a sensor indicate that the vehicle's temperature changes, the charging/discharging profile may be updated to change accordingly as the temperature will affect the charge/discharge of the power storage device. Besides, the charging profile may be updated responsive to e.g., setting change of an electric vehicle, a power supply 13 or a charging device 14, and/or any software update in the optimization system, e.g. software update for the processor 11 or for the charging device 14.

Above examples are not limiting and exhaustive, other parameters may also be contemplated to trigger updating the charging/discharging profile, e.g., change in outside temperature, power supply's temperature, power storage device's temperature, expected or known driving behaviors and so on. The parameters may be detected by a sensor.

In one embodiment, the processor 11 may detect the received machine learning data, big data, or a change regarding above parameters, and determine that update is necessary upon detecting newly received machine learning data, big data, or change regarding above parameters. In a further embodiment, the processor 11 may inform the update to the user via the output 12, the user may determine if he wishes to perform the update.

In the case of updating the charging/discharging profile responsive to machine learning data, big data, or a change regarding the optimization system and/or the electric vehicle including the power storage device 15, and optionally regarding the charging device 14 and/or the power supply 13, the output 12 may not output the originally determined charging/discharging profile to the user either, or, even the output 12 may not output any charging/discharging profile to the user at all, including the originally determined charging/discharging profile and the updated charging/discharging profile, instead, it outputs the charging/discharging profile to the charging device 14/the application device for generating appropriate charging currents to the power storage device or for e.g. setting speed limits for the vehicle.

According to the optimization system 10 shown in FIG. 1, the optimization system 10 may only include a processor 11 and an output 12 and be configured as an individual apparatus that may be used in combination with the charging device 14 and power supply 13 to charge the power storage device 15 in an electric vehicle. In this way, the optimization device 10 may be located at the electric vehicle, the charging device, or a remote device such as a cloud computing device. However, it is not limiting, the optimization system 10 may also comprise other components such as the charging device 14. The optimization system 10 is shown in dashed line in FIG. 1. The optimization system may be embodied by computer software, hardware, circuits, processor and controller and the like. Or the optimization system may be embodied in a computer storage medium comprising instructions for, when executed by one or more processors, achieving corresponding functions.

Figure 2:
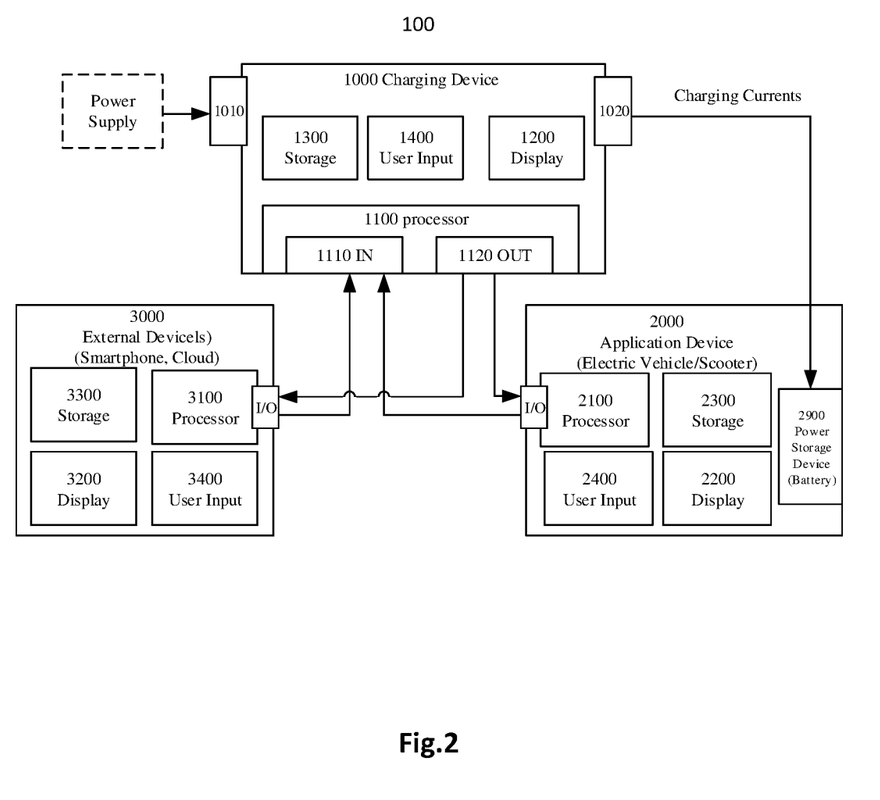
FIG. 2 is a schematic block diagram of an optimization system 100 according to another embodiment of the present invention.

FIG. 2 shows an optimization system 100 according to another embodiment of the present invention. Different from the optimization system 10 as shown in FIG. 1, the optimization system 100 may include a charging device 1000 for generating the charging currents for a power storage device like a battery, an application device 2000 including e.g., an electric vehicle or a scooter, and at least one external device 3000. The external device 3000 may be a smartphone, a computer, a tablet, a smart watch, a cloud computing device and any other devices that may achieve calculation, storage, display or input/output and can be coupled to any one of the charging device and the application device.

The external device 3000 may be preferred to compute the complex tasks since the processing capacity of the charging device 1000 and the application device 2000 may be limited. It may be contemplated that the computationally intensive processes such as comparison to big data or machine learning data are performed at the external device 3000 such as a cloud computing device while the less intensive processes are performed at the application device 2000 such as the electric vehicle or the charging device 1000.

In one aspect, the optimization system 100 may provide online services, e.g. receiving and processing real-time data, online determination of the charging/discharging profile, or online updating the charging/discharging profile, or even the optimization system 100 may perform the whole online optimization and update, with enough computing capacity.

However, one or more of the online services may be not available, e.g., the local processor such as that of the charging device or the application device has insufficient computation power and/or the external device 3000 is not connected or the connection is interrupted. In this case, one or more of the unavailable online services may be performed offline in advance. Heuristic data or characteristic data determined based on the offline services and/or previous available optimization may be provided for a simpler online optimization to determine/update the optimization profile. The heuristic data or characteristic data may be a heuristic or characteristic table or a heuristic or characteristic map.

In a particular embodiment, the heuristic data may be data according to previous available optimization results. For example, if current battery lifetime may not be received for some reasons, the heuristic data indicative of battery lifetime after previous available optimization may be used for a current optimization.

The optimization system may include an electric vehicle as the application device, a smartphone as the external device, and a charging device, both the smartphone and the charging device are coupled to the electric vehicle. In an embodiment, the smartphone may include a graphical user interface such as an app that can be used to ask for detailed settings and parameters input from the user. Other embodiments may also be contemplated.

In the embodiment shown in FIG. 2, each of the charging device 1000, the application device 2000 and the external device 3000 may include respective storages, displays, user inputs and processors. In particular, the charging device 1000 includes a processor 1100, a display 1200, a storage 1300, and a user input 1400, the charging device 1000 may also include connections 1010 and 1020 to the power supply and a power storage device, the processor 1100 of the charging device 1000 may comprise its input 1110 and output 1120 for receiving and delivering data from/to the external device 3000 and/or the application device 2000 respectively. The application device 2000 includes a processor 2100, a display 2200, a storage 2300, and a user input 2400. The application device 2000 may also include a power storage device 2900 like battery. In case of electric vehicle, the processor 2100 of the electric vehicle may be located in a motor controller and/or a battery management system of the electric vehicle, and the display 2200 may be located at a speedometer of the electric vehicle. The external device 3000 includes a processor 3100, a display 3200, a storage 3300, and a user input 3400, both the application device 2000 and the external device 300 may have input/output interfaces coupled to the charging device 1000, especially the input 1110 and output 1120 of the charging device 1000. The external device 3000 may be a device in cloud that may store or process the received data.

FIG. 2 shows the input 1110 and output 1120 in the processor 1100 of the charging device 1000, it is also contemplated that the connections are arranged as separate components. The charging device 1000 may be coupled to the power supply 4000 via the connection 1010 and coupled to the power storage device 2900 via the connection 1020.

In this embodiment, any one or any combination of the processors 1100, 2100 and 3100 may achieve the functions of the processor 11 as shown in FIG. 1, i.e., determining and updating the charging profile. A user may interact with the optimization system via any of user inputs and displays of the charging device 1000, the application device 2000 and the external device 3000. In one example, the user may set and reset the system setting or change system parameters via the interaction with the optimization system. In another example, the user may reject, accept or change the charging/discharging profile/parameters via the interaction with the optimization system. In a further embodiment, the user may input parameters to the optimization system via any one of the user inputs and get feedbacks from any one of the displays.

In the optimization system 100 as shown in FIG. 2, one or more processors, displays, user inputs and storages of the charging device, the application device and the external device may be omitted. For example, the charging/discharging profile may be determined and/or updated in the external device 3000 and/or the application device 2000, and then is delivered to the charging device for generating the charging currents based on the charging profile, or is delivered to the application device for setting driving limits or giving hints to the driver based on the discharging profile. In this case, the processor 1100, the display 1200 and the user input 1400 may be omitted. Or, the charging/discharging profile may be determined and/or updated in the charging device 1000 and displayed to the user. The application device 2000 and the external device 3000 only provide at least part of data and parameters to be used during determining and/or updating the charging/discharging profile, such that e.g. the displays 2200, 3200 and processors 2100, 3100 may be omitted from the optimization system. The external device 3000 may even refer to a temperature sensor. Actually, the external device 3000 as a whole may be omitted also. Furthermore, the application device may be omitted from the optimization system also, in this way, the charging device may achieve determining and updating the charging/discharging profile itself. Or the external device may achieve determining and updating the charging/discharging profile itself.

The data received or derived by the optimization system may be stored at any one of the charging device 1000, the application device 2000, or the external device 3000, or even the data may be stored at a remote location, such a cloud device. In view of charging the power storage device, the received data may comprise at least one of user input(s), data from a cloud, and data regarding the application device, the charging device, the external device and/or the power supply.

Although the optimization system is described with reference to the embodiment as shown in FIGS. 1 and 2 respectively, it may be contemplated to configure the optimization system in other ways, as long as its function may be achieved to determine and update the charging/discharging profile for the power storage device. The components shown in FIGS. 1 and 2 may be respectively combined, divided or even deleted as long as the charging/discharging profile may be determined and updated for the power storage device. If necessary, some components may be added to the optimization system to achieve its functions.

The terms "connect", "connection", "coupling" and "couple" in this disclosure include various manner, e.g., wireless (such as inductive, Bluetooth or WIFI) or wired (such as via a cable). The data may be received or delivered in wireless or wired way according to a particular application. The terms "processor" may refer to any kinds of devices which have the capacity to process the data, including but not limited to logics, a microcontroller, a computer, a kernel, a cloud device or a CPU and so on.

Data Received by the Optimization System

As mentioned above, the data received by the processor(s) of the optimization system 10, 100 comprise at least one of user input(s), data from a cloud, data regarding the application device, and optionally data regarding the power supply and data regarding the charging device.

The user inputs may include a desired departure time such as when driving to work in the morning, route/distance/destination information, or a user's preference or choice for a next day's driving, temperatures and so on. For example, the user may select a quick charge or giving a time window when to start the driving for next day. Or the user may be requested to input the experience related data from which the processor may obtain the driving style, e.g., by machine learning.

The data from the cloud includes for example, machine learning data, big data, or any real time or historical data recorded, stored or derived at a cloud, for example a temperature obtained from a weather forecast, various travelled data including route, speed, and acceleration, GPS data and so on. The machine learning data and the big data may be stored regarding a similar power storage device, a similar vehicle, a similar driver and so on. The big data may be obtained by fleet data in the cloud. The machine learning data, big data and the travelled data may also be stored in the application device and be a part of data regarding the application data.

Figure 5A:
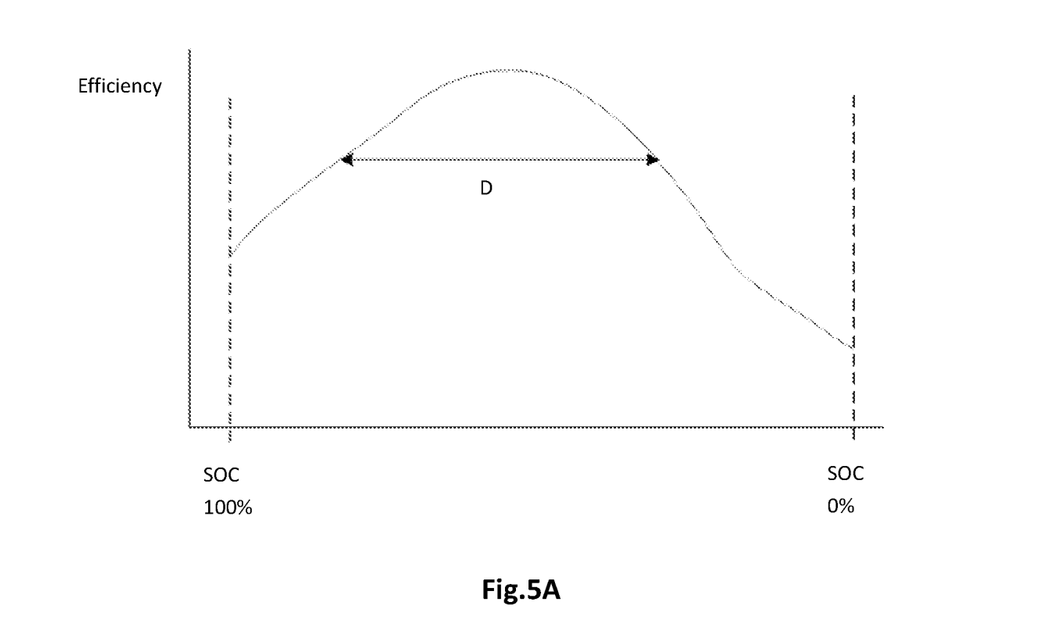
FIG. 5A and FIG. 5B show a schematic diagram of an efficiency map respectively.
Figure 5B:
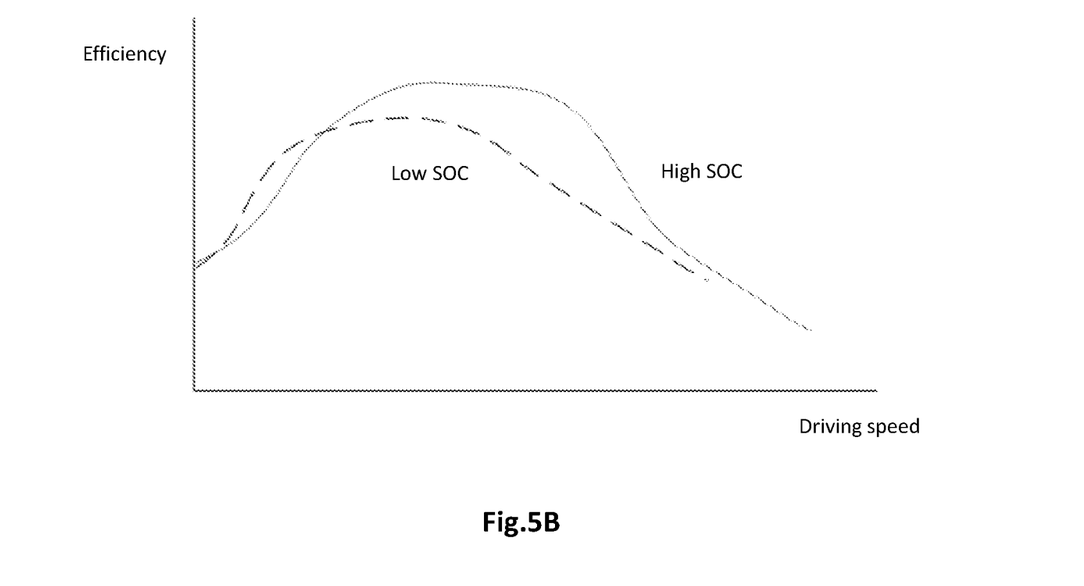

The data regarding the application device include one or more parameters of the application device and data recorded or derived at the application device. In particular, the data regarding the application device like electric vehicles may be a vehicle type, types of vehicle's components such as a type of a motor, a controller, a gearbox and tires, as well as any vehicle parameters. The vehicle parameters include maximum/average speed, a tire pressure, throttle data, wheel sizes, friction coefficients, wind resistance, mass, driver mass, power, voltage, current requirements, torque characteristics, used control scheme, inductances, magneto motive force and efficiency maps and so on. Examples of the efficiency maps are shown in FIGS. 5A and 5B and will be described below. The vehicle parameters include the parameters regarding the power storage device, the parameters regarding the power storage device consists of, but is not limited to, battery type, battery size, cell amount and connection type, cell chemistry, capacity and internal resistance, transport kinematics, aging behavior, type of battery management system and battery temperature. The vehicle parameters may be input by the user also. The data regarding the power supply may include type of the power supply, the cost for electricity and so on. The data regarding the charging device may include previous charging/discharging profiles if they are stored in the charging device. Any of the charging device, the application device and the external device may be include sensors.

The data received by the optimization system may include sensors for sensing one or more of environmental parameters including temperatures for the charging device, the power supply and/or the power storage device. The sensors may be located at the charging device, the application device and the power supply or may be as an external device.

The received data include real time data and historical data. The real time data may be collected by the sensors directly, including a temperature, a current value, a tire pressure and so on. Historical data includes various travelled data, such as previous speed, accelerations and distance/route, charging/discharging profiles, charging behaviors and travelling behaviors of a particular driver, and data of a similar driver, a similar route, or a similar application device, etc.

Although the particular examples of the received data are described above, they are not limiting and exhaustive, any data that may benefit for optimizing the use of the battery may be contemplated to use.

Data Output by the Optimization System

The optimization system may output data to the user or exchange data with the user. Data is displayed to the user using lights, displays of various types as well as acoustic or haptic signals. Depending on the system setup the data can be displayed on the application device, the charging device, and/or the external devices like smartphones.

The output data may include system parameters for e.g., the charging device and the application device. The system parameters may be detected by sensors or obtained from the system, including speed, acceleration, GPS derived position, slope, battery and motor temperatures, as well as current, voltage, and throttle in the electric vehicle. External devices can add some information for prognosis, e.g. weather forecast. The system parameters may also include driving, charging and storage times and average, maximum, minimum charging currents. Also past values of all those sensor and parameter data can be recorded and shown. In general all system parameters known to the optimization system can be displayed. This can be component information like wheel, motor, battery size and nominal power as well as component key parameters like motor resistance, inductances and flux, battery capacity and resistance, as well as all aging relevant parameters, like Li-ion transport and solid electrolyte interface layer growth factors or fitted average parameters.

The output data may further include derived data, e.g. obtained by the optimization. This includes possible range with the current charge and driving style, estimated remaining battery lifetime and expected charging time to full charge or a specified state of charge, and the best time to charge, expected energy costs, component status and aging, state of charge and other influences known to the system. The derived data may also include a current state of charge, notification or alerts when exceeding some predefined or calculated thresholds. Furthermore, the derived data may also include information about the expected performance, e.g. possible and desired acceleration and top speed.

The output data may further include optimization results to show the user the improvements and benefits he achieved. This can e.g. be information about battery lifetime prolongation, in qualitative or quantitative way. Tips can show qualitatively which behaviors are beneficial for the desired goal or show quantitatively how behaviors are beneficial for the desired goal. For example, the current charging and driving can be compared to previous charging and driving behaviors of the user or compared to other users, e.g. using cloud fleet data, and information like, "compared to previous days, your current charging and driving behavior is more beneficial for your battery", "today you prolonged your battery life by 1 day compared to your previous charging style" may be output to the driver. If the charging/discharging profile is optimized for range and charging time, information about the usual range and the range achieved by the optimized charging/discharging, charging/discharging time and driving tips as well as efficiency improvements can be displayed.

The output data may further include tips for the driver to motivate the user to use the described charging strategies as well as to make him understand how he can improve the lifetime, range, the tips may include e.g. "the user should not always fully charge his battery, should charge only if the vehicle is not too hot and drive more slowly at hot temperatures". The user can receive for example the tips each time before starting, which might be directly related to the optimizing criteria he chose. All those tips can be depending on the information input by the user and data available to the system.

The output data may further include maintenance information. For example, depending on the calculated battery lifetime, the user can be informed, when the battery has to be replaced. Historical data can be used to detect failures or probable failures in future for the battery. This can e.g. be a sudden increase in battery resistance and corresponding battery temperature increase while charging/driving.

The output data may further include possible software updates by the user and bonus information. The optimization system may compare the user's daily trips, range and battery lifetime prolongation as well as charging/discharging profiles to other users in the cloud. Criteria for the bonus can be e.g. economic or ecological driving, routes and driving distances, high speed or steady driving. The bonus information may be "driving awards" or bonus points for vehicle repairs.

Although the particular examples of the output data are described above, they are not limiting and exhaustive, any data that may benefit for optimizing the use of the battery may be contemplated to use.

Figure 3:
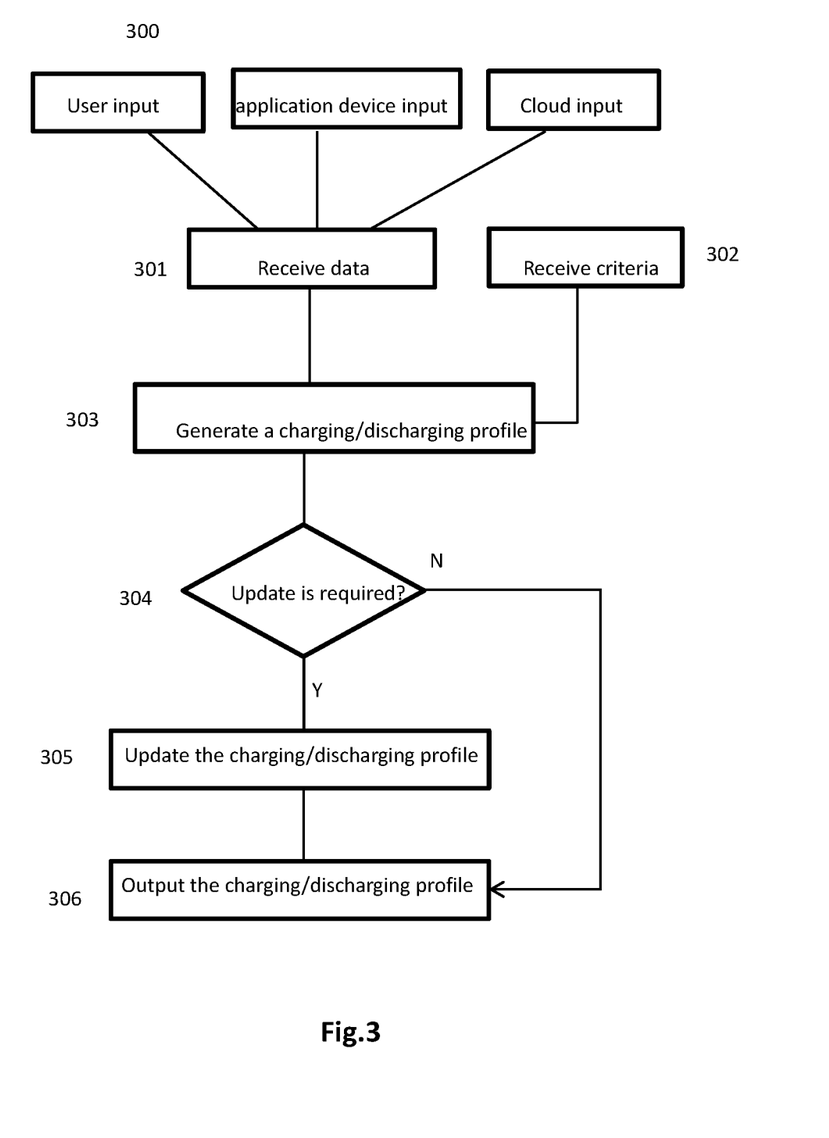
FIG. 3 is a flow chart of an optimization method 300 according to one embodiment of the present invention.

FIG. 3 shows an optimization method 300 according to one embodiment of the present invention. First, the data comprising at least one of user input(s), data from a cloud, data regarding an application device including a power storage device to be charged/discharged and so on are received at a step 301, and the criteria for charging or discharging the power storage device are received at a step 302, e.g. the criteria may be selected by the user or determined automatically. A charging/discharging profile is determined from the received data based on the determined criteria at a step 303. At least one of the user feedback regarding the charging/discharging profile, machine learning data, big data, and a change regarding the optimization system and/or the application device is received so as to determine if an update is required at a step 304, for example, the user may determine an update is required by giving a feedback. If the update is affirmed by the user rejecting the determined charging/discharging profile, the charging/discharging profile may be updated at a step 305 based on the received at least one of the user feedback regarding the charging/discharging profile, machine learning data, big data, and a change regarding the optimization system and/or the application device. If the update is determined to be not required, the determined charging/discharging profile may be output at a step 306.

In one embodiment, the method 300 comprises determining an expected route and/or power consumption for the electric vehicle according to driving behaviors and/or charging behaviors of the user at the step 301, and determining the charging/discharging profile for charging or discharging the power storage device based on the expected route and/or power consumption for the electric vehicle at the step 303.

In another embodiment, the method 300 comprises receiving at least one of data regarding the charging device, data regarding the power supply and the data from an external device configured to be coupled to the application device and/or the charging device at the step 301, determining the charging profile based on the received data and the received at least one of data regarding the charging device, data regarding the power supply and data from the external device at the step 303, wherein the data regarding the charging device and the data regarding the power supply respectively include one or more parameters of the charging device and the power supply and data recorded or derived at the charging device and the power supply.

The method 300 shown in FIG. 2 is only illustrative but not limited; various steps of the method may be combined, divided and even deleted for achieving similar function.

Figure 4A:
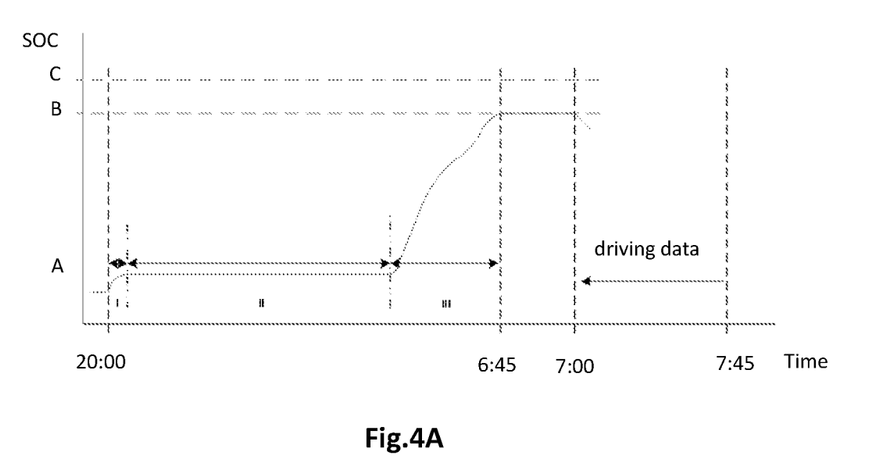
FIG. 4A and FIG. 4B show a schematic diagram of a charging profile determined/updated according to one embodiment of the present invention.
Figure 4B:
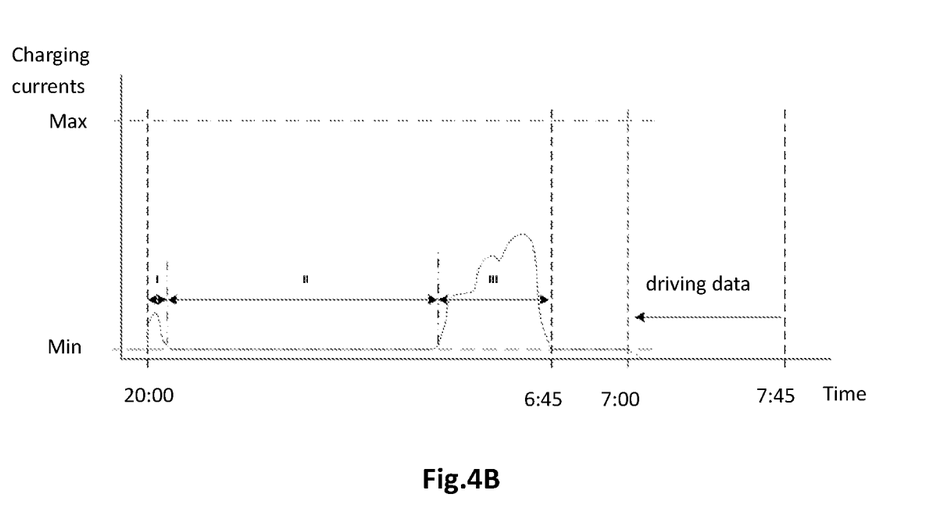

FIG. 4A and FIG. 4B show a schematic diagram of a charging profile determined/updated for a criteria including at least lifetime prolongation of a power storage device according to one embodiment of the system or method of the present invention. FIG. 4A shows a state of charge (SOC) of the charging profile (Y axis) versus time (X axis) and FIG. 4B shows a charging current of the charging profile (Y axis) versus time (X axis). At 20:00, a previous driving of an electric vehicle ends and the power storage device of the electric vehicle is connected to a charging device for charging, then the power storage device may be charged according to the charging profile determined by the optimization system/method mentioned above.

As shown in FIGS. 4A and 4B, the charging profile is determined as having a first charging phase I, a second charging phase II and a third charging phase III. In FIG. 4A, the power storage device is charged to an optimal storage state of charge A firstly in the first charging phase I, waits in the second charging phase II and is charged to a desired state of charge or determined optimal state of charge B for the power storage device that is lower than full charge C in the third charging phase III before an expected end of charge. The first charging phase I may start from the connection of the electric vehicle to the charging device and the third charging phase III may end at 6:45 AM shortly before the predetermined driving start time, i.e., 7:00 AM so as to provide a margin (e.g., 15 minutes from 6:45 AM to 7:00 AM) to avoid that the driver start driving earlier than the predetermined driving start time. FIG. 4B shows corresponding charging currents of the charging phases of the charging profile.

In combination with above descriptions regarding embodiments of the invention, the charging profile may be determined based on e.g., the received driving start time, driving end time, driving destination/route, driver behaviors as well as the received criteria. Above parameters may be received from user inputs, cloud or the application device, or even an external device such as a smartphone. After the charging from 20:00 to 6:45 by using the determined charging profile, the driver may drive the electric vehicle from 7:00 to 7:45 according to the received driving start time, driving end time, driving destination/route, as well as driver behaviors for achieving the received criteria, e.g., fast driving, power saving or lifetime prolongation of the power storage device. The current driving data may be collected and used for determining following charging profiles.

FIGS. 4A and 4B only show one example of the charging profile, the charging profile may be shown in other ways, for example, the charging profile may be shown relative to different factors that may affect the charging profile, except time, the charging currents and the state of charge as shown in FIGS. 4A and 4B. The factors are including but not limited to temperatures (e.g., an outside temperature, a motor temperature, a power supply temperature and a power storage temperature and the like), depth of discharging, next day's driving behavior and so on.

FIG. 5A and FIG. 5B respectively show a schematic diagram of an efficiency map for a given driving route. When a range extension is selected as criteria for optimizing the use of the power storage device, the efficiency map for a given driving route may be used to optimize the driving range of an electric vehicle by considering the efficiency. Or the efficiency may be used as an individual criterion for charging/discharging and alternatively may be combined with other criteria such as battery lifetime.

FIG. 5A shows the efficiency (Y axis) dependent on a state of charge of the power storage (X axis) for a given route. From FIG. 5A, it may be determined that for the given route, the best efficiency is not proportional to the state of charge, actually, it may be obtained where voltage and current are in the best area for both a motor and power electronics of the vehicle. In order to achieve better efficiency, the required state of charge may be determined as being within a range D as shown in FIG. 5 for charging the power storage device.

FIG. 5B shows the efficiency (Y axis) dependent on driving speed of the driver (X axis) for different, e.g., low or high, state of charge. It may be seen that the driving speed is not directly proportional to the driving speed. It is possible that the power storage device is charged to a sufficient state of charge for a next trip first, e.g., according to a received criterion as described with respect to above optimization system and method, and then the driving speed may be determined according to the efficiency map as shown in FIG. 5B for obtaining the speed which is preferred for the driver for driving the vehicle.

Figure 6:
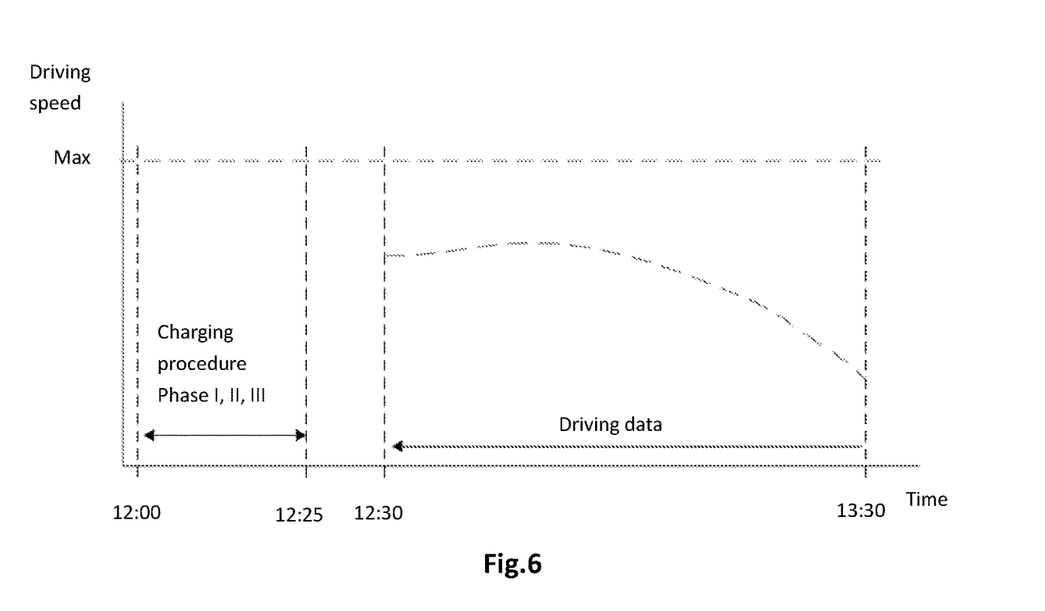
FIG. 6 shows an example of a discharging profile according to one embodiment of the present invention.

One example of a driving profile showing the best efficiency driving speed (Y axis) dependent on time (X axis) is shown in FIG. 6. The driving profile may be one embodiment of determined/update discharging profile. As shown in FIG. 6 a previous driving ends and the power storage device is connected to a charging system at 12:00, a charging procedure is performed between 12:00 and 12:25, the charging profile used during the charging procedure may be obtained e.g. by the optimization system and/or method as descried above. Before the predetermined driving start time, i.e. 12:30, there is 5 minutes left as a margin to avoid the driver start the driving earlier. Between 12:30 and 13:30, the driver may drive the car by referring to the shown driving profile to achieve the best efficiency. The current driving data may be collected and used for determining following charging profiles. The driving profile shown in FIG. 6 is only an example for determined/updated discharging profile, other forms of the discharging profile may also be contemplated.

It should be noted that the above-mentioned embodiments illustrate rather than limit the invention and that those skilled in the art would be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the product claims enumerating several units, several of these units can be embodied by one and the same item of software and/or hardware. The usage of the words first, second and third, et cetera, does not indicate any ordering. These words are to be interpreted as names.

The invention claimed is:

1. An optimization system comprising:
a processor configured (i) to receive one or more criteria for optimizing use of a power storage device in an application device, (ii) to receive data comprising at least one of user input(s), data from a cloud, and data regarding the application device, and (iii) to determine a charging/discharging profile for charging or discharging the power storage device from the received data based on the received one or more criteria, the charging/discharging profile defining values over time for at least one of charging/discharging currents, charging/discharging voltages, and states of charge of the power storage device during a charging/discharging process; and
an output configured to output the charging/discharging profile to at least one of (i) a charging device configured to charge or discharge the power storage device according to the charging/discharging profile, and (ii) an electric vehicle configured to set limits for one or more parameters of the electric vehicle according to the charging/discharging profile;
wherein the processor is further configured (i) to receive at least one of user feedback regarding the charging/discharging profile, machine learning data, big data, and a change regarding the optimization system and/or the application device, and (ii) to update the charging/discharging profile based on the received at least one of the user feedback regarding the charging/discharging profile, the machine learning data, the big data, and the change regarding the optimization system and/or the application device.

2. The optimization system of claim 1, wherein:
the data regarding the application device include one or more parameters of the application device and data recorded or derived at the application device, and
the one or more parameters of the application device comprises one or more parameters of the power storage device and powertrain parts.

3. The optimization system of claim 2, wherein the data regarding the application device comprise real-time data and historical data.

4. The optimization system of claim 1, wherein:
the application device comprises the electric vehicle, and
the processor is further configured (i) to determine an expected route and/or power consumption for the electric vehicle according to driving behaviors and charging behaviors of a user, and (ii) to determine the charging/discharging profile for charging or discharging the power storage device based on the expected route and/or the power consumption for the electric vehicle.

5. The optimization system of claim 1 wherein:
the one or more criteria include a plurality of criteria for optimizing use of the power storage device in the application device, and
the processor is further configured (i) to receive the plurality of criteria for optimizing use of the power storage device in the application device; (ii) to receive a weighting factor for each criterion of the plurality of criteria; (iii) to determine one or more optimizing parameters for each criterion of the plurality of criteria based on the received data; and (iv) to determine the charging/discharging profile based on the one or more optimizing parameters and the weighting factor for each criterion of the plurality of criteria.

6. The optimization system of claim 1 wherein the received one or more criteria comprise battery lifetime, range extension, performance, electricity cost, efficiency and/or charging time.

7. The optimization system of claim 1 further comprising:
the application device comprising the power storage device to be charged, the charging device configured to couple to a power supply and to generate a charging current to the power storage device from the power supply, and at least one external device configured to couple to the application device and/or the charging device, wherein the processor is located at at least one of the application device, the charging device and the at least one external device.

8. The optimization system of claim 7, wherein:

the processor is further configured (i) to receive at least one of data regarding the charging device, data regarding the power supply and data from the external device, and (ii) to determine the charging/discharging profile based on the received data and the received at least one of data regarding the charging device, the data regarding the power supply and the data from the external device, and the data regarding the charging device and the data regarding the power supply respectively include one or more parameters of the charging device and the power supply and data recorded or derived at the charging device and the power supply.

9. The optimization system of claim 1, wherein:

the received one or more criteria comprise at least battery lifetime, the processor is configured to determine the charging/discharging profile as having a first charging phase, a second charging phase and a third charging phase, and the power storage device is charged to an optimal storage state of charge in the first charging phase, waits in the second charging phase and is charged to a desired state of charge in the third charging phase before an expected end of charge.

10. An optimization method comprising:

receiving one or more criteria for optimizing use of a power storage device in an application device;

receiving data comprising at least one of user input(s), data from a cloud, and data regarding the application device;

determining a charging/discharging profile for charging or discharging the power storage device from the received data based on the received one or more criteria, the charging/discharging profile defining values over time for at least one of charging/discharging currents, charging/discharging voltages, and states of charge of the power storage device during a charging/discharging process;

outputting the charging/discharging profile to at least one of (i) a charging device configured to charge or discharge the power storage device according to the charging/discharging profile, and (ii) an electric vehicle configured to set limits for one or more parameters of the electric vehicle according to the charging/discharging profile;

receiving at least one of user feedback regarding the charging/discharging profile, machine learning data, big data, and a change regarding the optimization system and/or the application device; and updating the charging/discharging profile based on the received at least one of the user feedback regarding the charging/discharging profile, the machine learning data, the big data, and the change regarding the optimization system and/or the application device.

11. The optimization method of claim 10, wherein:

the data regarding the application device include one or more parameters of the application device and data recorded or derived at the application device, and the one or more parameters of the application device comprises one or more parameters of the power storage device and powertrain parts.

12. The optimization method of claim 11, wherein the data regarding the application device comprise real-time data and historical data.

13. The optimization method of claim 10, wherein:

the application device comprises the electric vehicle, and the method further comprises:

determining an expected route and/or power consumption for the electric vehicle according to driving behaviors and/or charging behaviors of a user, and determining the charging/discharging profile for charging or discharging the power storage device based on the expected route and/or the power consumption for the electric vehicle.

14. The optimization method of claim 10 wherein the one or more criteria include a plurality of criteria for optimizing use of the power storage device in the application device, and the method further comprises:

receiving a plurality of criteria for optimizing use of the power storage device; and receiving a weighting factor for each criterion of the plurality of criteria;

determining one or more optimizing parameters for each criterion of the plurality of criteria based on the received data; and determining the charging/discharging profile based on the one or more optimizing parameters and the weighting factor for each criterion of the plurality of criteria.

15. The optimization method of claim 10 wherein the received one or more criteria comprise battery lifetime, range extension, performance, electricity cost, efficiency and/or charging time.

16. The optimization method of claim 10, wherein:

the one or more criteria comprise at least battery lifetime, and the method further comprises determining the charging profile as having a first charging phase, a second charging phase and a third charging phase, charging the power storage device to an optimal storage state of charge in the first charging phase, waiting in the second charging phase, and charging to a desired state of charge in the third charging phase before an expected end of charge.

17. The optimization method of claim 10 further comprising:

receiving at least one of data regarding the charging device configured to couple to a power supply and generate a charging current to the power storage device from a power supply, data regarding the power supply and the data from an external device configured to be coupled to the application device and/or the charging device;

determining the charging/discharging profile based on the received data and the received at least one of data regarding the charging device, the data regarding the power supply and the data from the external device, wherein the data regarding the charging device and the data regarding the power supply respectively include one or more parameters of the charging device and the power supply and data recorded or derived at the charging device and the power supply.

18. The optimization method of claim 10, wherein a computer storage medium comprises instructions for, when executed by one or more processors, performing the method.

19. The optimization system of claim 1, wherein:
the application device comprises the electric vehicle,
the received one or tore criteria includes range extension of the electric vehicle, and
an efficiency for a given driving route of the electric vehicle is used to determine the charging/discharging so as to extend a driving range of the electric vehicle.

20. The optimization system of claim 1, wherein the application device comprises the electric vehicle, and at least one of:
the received one or criteria includes only an efficiency for a given driving route, and the received one or more criteria includes the efficiency combined with at least one other criterion.

* * * * *

UNITED STATES PATENT AND TRADEMARK OFFICE
CERTIFICATE OF CORRECTION

| | | |
|---|---|---|
| PATENT NO. | : 11,685,284 B2 | Page 1 of 1 |
| APPLICATION NO. | : 17/044208 | |
| DATED | : June 27, 2023 | |
| INVENTOR(S) | : Rechkemmer et al. | |

It is certified that error appears in the above-identified patent and that said Letters Patent is hereby corrected as shown below:

In the Claims

In Claim 19, at Column 17, Line 3: "one or tore criteria" should read --one or more criteria--.

In Claim 20, at Column 17, Line 11: "one or criteria" should read --one or more criteria--.

Signed and Sealed this
Twelfth Day of September, 2023

*Katherine Kelly Vidal*

Katherine Kelly Vidal
*Director of the United States Patent and Trademark Office*